(12) United States Patent
Romanenko et al.

(10) Patent No.: US 10,238,980 B2
(45) Date of Patent: Mar. 26, 2019

(54) VERTICAL WIND TUNNEL SKYDIVING SIMULATOR

(71) Applicants: Ruslan Romanenko, Misato (JP);
Alexandr Parmanin, Misato (JP);
Aleksandr Ivoninskii, Misato (JP);
Svjatoslav Lisin, Misato (JP)

(72) Inventors: Ruslan Romanenko, Misato (JP);
Alexandr Parmanin, Misato (JP);
Aleksandr Ivoninskii, Misato (JP);
Svjatoslav Lisin, Misato (JP); Ivan Savchenko, Misato (JP); Eugeny Sharov, Misato (JP)

(73) Assignees: Ruslan Romanenko, Misato (JP);
Alexander Parmanin, Misato (JP);
Aleksandr Ivoninskii, Misato (JP);
Svjatoslav Lisin, Misato (JP)

( * ) Notice: Subject to any disclaimer, the term of this patent is extended or adjusted under 35 U.S.C. 154(b) by 0 days.

(21) Appl. No.: 15/951,568

(22) Filed: Apr. 12, 2018

(65) Prior Publication Data
US 2018/0229130 A1 Aug. 16, 2018

Related U.S. Application Data

(63) Continuation of application No. 15/789,234, filed on Oct. 20, 2017, now Pat. No. 10,086,298, which is a (Continued)

(30) Foreign Application Priority Data

Apr. 22, 2015 (JP) .................................. 2015-087187
Jul. 7, 2015 (GB) .................................. 1511866.4

(51) Int. Cl.
*A63G 31/16* (2006.01)
*A63G 31/00* (2006.01)
(Continued)

(52) U.S. Cl.
CPC ............. *A63G 31/00* (2013.01); *B64D 23/00* (2013.01); *G01M 9/02* (2013.01); *G01M 9/04* (2013.01); *A63G 2031/005* (2013.01)

(58) Field of Classification Search
CPC ........ A63G 31/00; A63G 31/16; A63G 21/00; A63G 21/16; G09B 9/00; G09B 9/08; G09B 19/00; G09B 19/16
(Continued)

(56) References Cited

U.S. PATENT DOCUMENTS

| | | |
|---|---|---|
| 3,484,953 A | 12/1969 | Norheim, Jr. |
| 5,655,909 A | 8/1997 | Kitchen et al. |
| 6,042,490 A | 3/2000 | Lenhart |

(Continued)

FOREIGN PATENT DOCUMENTS

| | | |
|---|---|---|
| JP | 55-35662 | 3/1980 |
| JP | 02-036887 A | 2/1990 |

(Continued)

OTHER PUBLICATIONS

JP Examination Report issued in JP Application No. 2015-087187.
(Continued)

*Primary Examiner* — Kien Nguyen
(74) *Attorney, Agent, or Firm* — Saul Ewing Arnstein & Lehr LLP

(57) ABSTRACT

A vertical wind tunnel skydiving simulator including a flight chamber entrance that has a curved air deflector that extends into a waiting chamber, in which a convex surface of the curved air deflector faces across or towards the flight chamber entrance or into the flight chamber, and extends into the waiting chamber a sufficient distance to substantially reduce the flow of turbulent air into the waiting chamber. The curved surface is at the top of the entrance and can also be at the sides. The shape the curved surface takes is sufficient to minimize the flow of turbulent air into the waiting
(Continued)

chamber; the effect is to make it more comfortable and less noisy for people in the waiting area. This also helps to preserves the laminar, non-turbulent flow of air in the flying chamber, even across the flight chamber entrance. This makes flying more comfortable and predictable.

28 Claims, 7 Drawing Sheets

Related U.S. Application Data continuation of application No. PCT/GB2016/051137, filed on Apr. 22, 2016.

(51) Int. Cl.
- *B64D 23/00* (2006.01)
- *G01M 9/02* (2006.01)
- *G01M 9/04* (2006.01)
- *G09B 9/00* (2006.01)

(58) Field of Classification Search
USPC ......... 472/49–50, 130, 136, 137; 434/30, 35
See application file for complete search history.

(56) References Cited

U.S. PATENT DOCUMENTS

| | | | |
|---|---|---|---|
| 6,083,110 A | 7/2000 | Kitchen et al. | |
| 6,179,619 B1 * | 1/2001 | Tanaka | A63G 7/00 434/307 R |
| 6,796,908 B2 * | 9/2004 | Weston | A63G 7/00 434/55 |
| 7,153,136 B2 | 12/2006 | Hatlestad et al. | |
| 7,156,744 B2 | 1/2007 | Metni et al. | |
| 8,668,497 B2 | 3/2014 | Nebe et al. | |
| 9,194,632 B2 | 11/2015 | Metni et al. | |
| 9,327,202 B2 | 5/2016 | Lurie | |
| 2006/0025227 A1 | 2/2006 | Metni et al. | |
| 2006/0105300 A1 | 5/2006 | Moinel Delalande | |
| 2006/0180647 A1 | 8/2006 | Hansen | |
| 2009/0312111 A1 | 12/2009 | Gil et al. | |
| 2010/0240454 A1 * | 9/2010 | Xiao | A63G 21/20 463/30 |
| 2012/0312502 A1 | 12/2012 | Metni et al. | |

FOREIGN PATENT DOCUMENTS

| | | |
|---|---|---|
| JP | 10-156047 A | 6/1998 |
| JP | 2006-204375 A | 8/2006 |
| JP | 2016-202523 A | 12/2016 |
| WO | 01/46916 A2 | 6/2001 |
| WO | 2011/044860 A1 | 4/2011 |

OTHER PUBLICATIONS

Anonymous: "iFly—UAE's first indoor skydiving experience—Dubai, Mirdif City Center," retrieved from the Internet: URL: http://web.archive.org/web/20141113181450/http://www.theplaymania.com/gallery/ifly-photo-week, [retrieved on Aug. 8, 2016, (Nov. 13, 2014) XP055293935.

Anonymous: "iFly Dubai (United Arab Emirates): Top Tips Before You Go—TripAdvisor," retrieved from the Internet: URL: https://www.tripadvisor.co.uk/Attraction_Review-g295424-d2148489-Reviews-IFly_Dubai-Dubai_Emirate_of_Dubai.html#photos;geo=295424&detail=2148489&ff=43773028&albumViewMode=hero&albutid=101&baseMediaId=43773028&thumbnailMinWidth=50&cnt=30&offset=-1&filter=7 (retrieved on Aug. 5, 2016] (Jul. 1, 2012) XP055293880.

International Search Report, dated Oct. 19, 2016, and Written Opinion issued in PCT Application No. PCT/GB2016/051137.

Partial International Search Report, dated Aug. 18, 2016, issued in PCT Application No. PCT/GB2016/051137.

"TT45V1 Google Search," retrieved from the Internet: URL: https://www.google.com/search?q=TT45V1&biw=1527&bih=836&source=Int&tbs=cdr:1,cd_min:cd_max:April+22?2+2015&tbm=, retrieved on Jul. 16, 2017.

"TT45V1—Tunnel Technologies," retrieved from the Internet: URL: https://web.archive.org/web/20150925002946/http://tunneltech.ue;80/techynology/tt45v1; retrieved on Jul. 16, 2017.

"Software—Tunnel Technologies," retrieved from the Internet: URL: https://web.archive.org/web/20150925012140/http://tunneltech.eu:80/technology/software; retrieved on Jul. 16, 2017.

"Axial fans—Tunnel Technologies," retrieved from the Internet: URL: https://web.archive.org/web/20150925011936/http://tunneltech.eu:80/technologiy/axial-fans; retrieved on Jul. 16, 2017.

"News—p. 3 of 4—Tunnel Technologies," retrieved from the Internet: URL: http://tunneltech.eu/company/news/page/3/; retrieved on Jul. 16, 2017 (Jun. 9, 2015).

"Wind Games 2015 Video 12 Finals Dynamic—YouTube," retrieved from the Internet: URL: https://www.youtube.com/watch?v=pyCb7KkV92E; retrieved on Jul. 16, 2017 (Jan. 24, 2015).

"WD Games 2015 Video 8 Round 6 & 7 FS Female—YouTube," retrieved from the Internet: URL: https://www.youtube.com/watch?v=hx1GxRvkCtg; retrieved on Jul. 16, 2017 (Jan. 24, 2015).

"Airspace Charlewars Indoor Skydiving Competition Finals Part 3—YouTube," retrieved from the Internet: URL: https://www.youtube.com/watch?v=kFRARPU5osA; retrieved on Jul. 16, 2017 (Jun. 10, 2014).

"The Wind Games 2014—YouTube," retrieved from the Internet: URL: https://www.youtube.com/watch?v=QrhnRTKOmRU; retrieved on Jul. 16, 2017 (Apr. 15, 2014).

UK Search and Examination Report, dated Jan. 5, 2016, issued in GB Application No. GB1511866.4.

"Ifly Dubai, tripadvisor.co.uk," retrieved from the Internet: URL: http://www.tripadvisor.co.uk/Attraction_Review-g295424-d2148489-Reviews_IFly_Dubai-Dubai_Emirate_of_Dubai.html; retrieved on Dec. 31, 2015 (Mar. 2013).

Bridget M, "Ifly Houston, yelp.com," retrieved from the Internet: URL: http://www.yelp.com/biz_photos/ifly-indoor-skydiving-houston-houston; retrieved on Dec. 31, 2015 (Apr. 23, 2015).

"Flystation," retrieved from the Internet: URL: http://flystation.net/virtual; retrieved on Dec. 31, 2015 (Apr. 20, 2015).

* cited by examiner

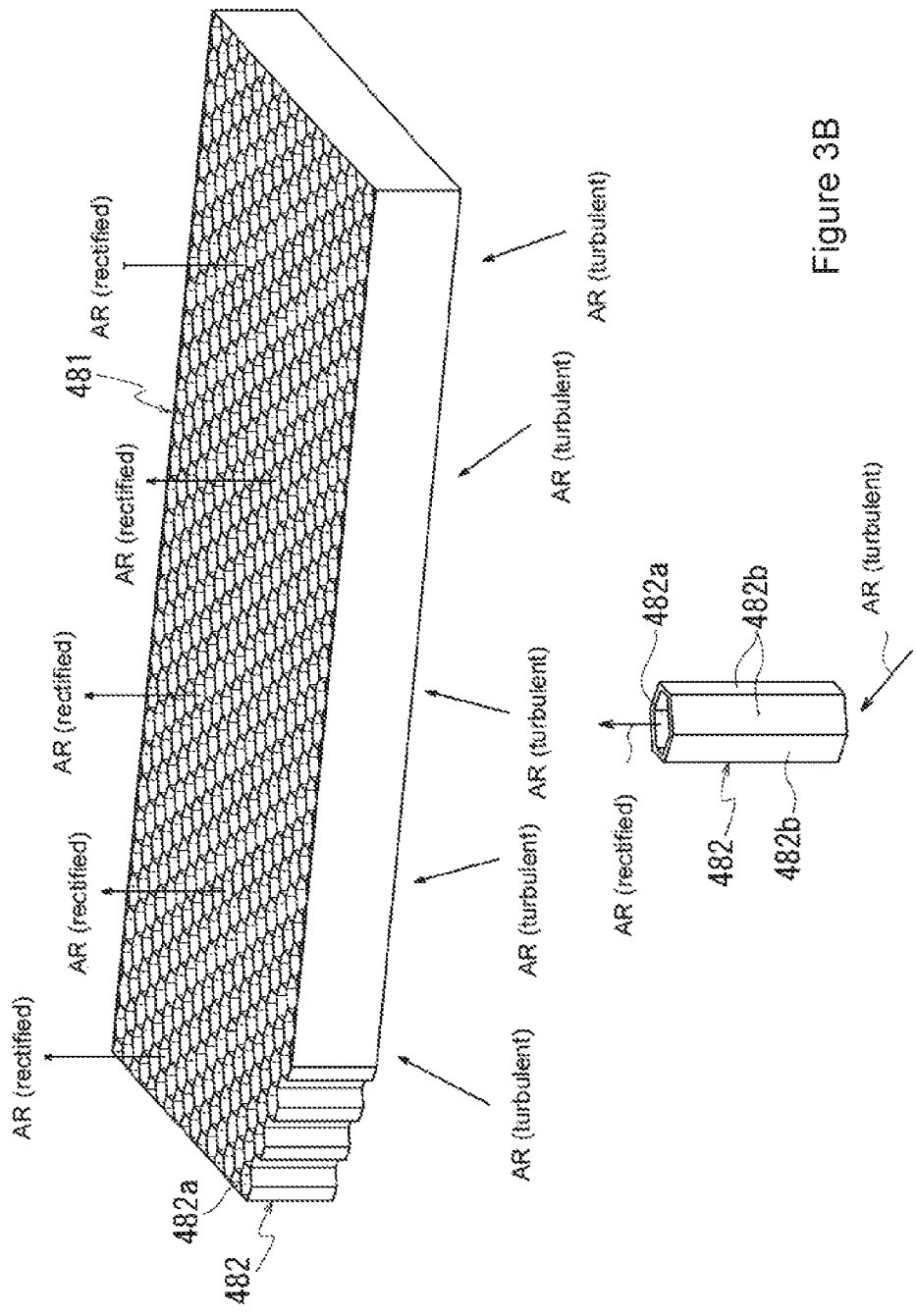

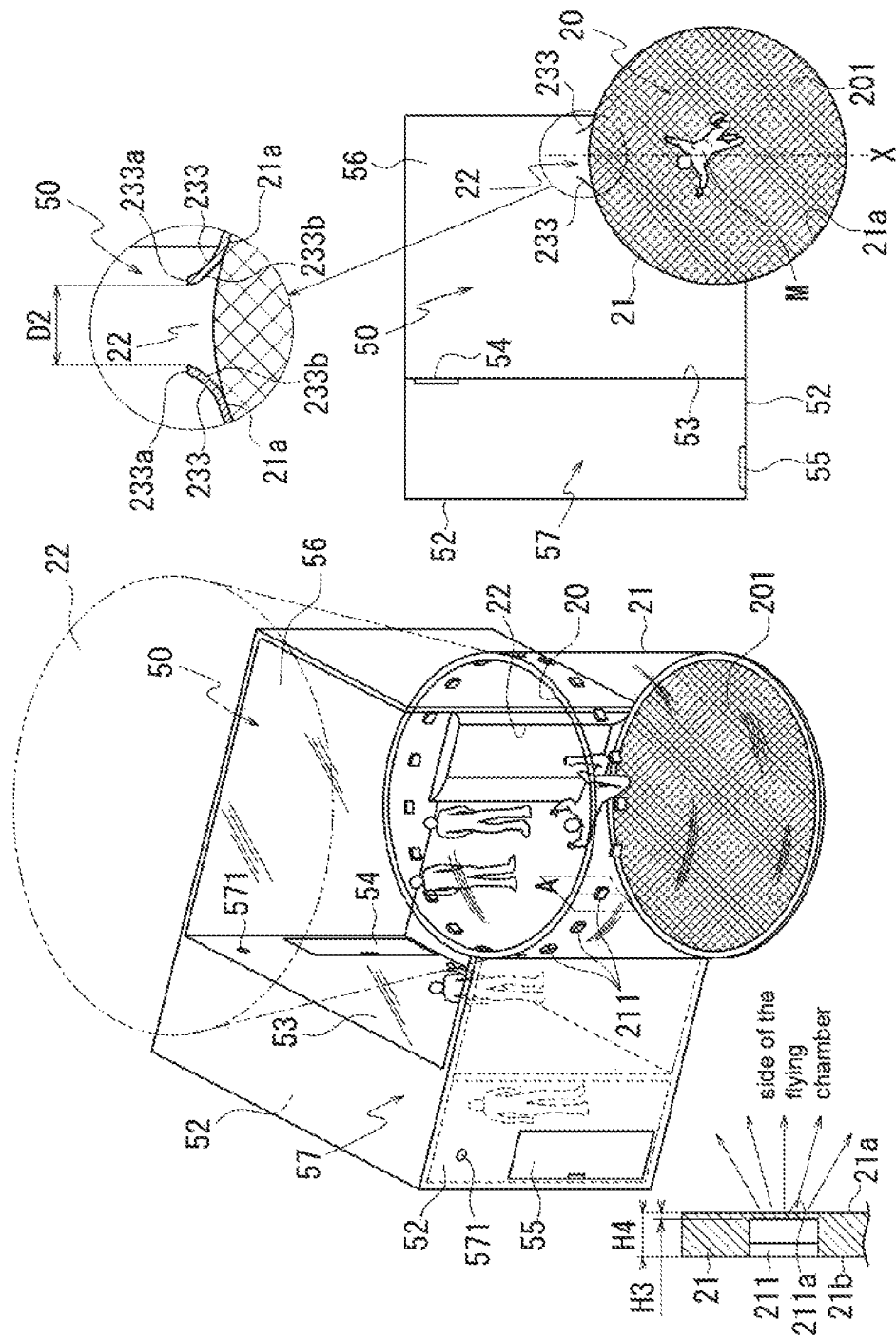

Figure 5A
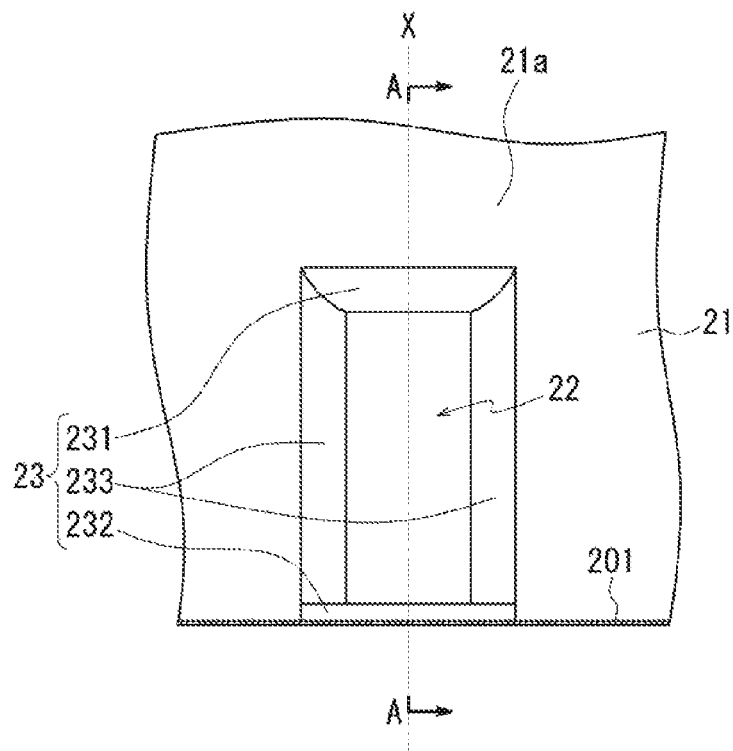
Figure 5B
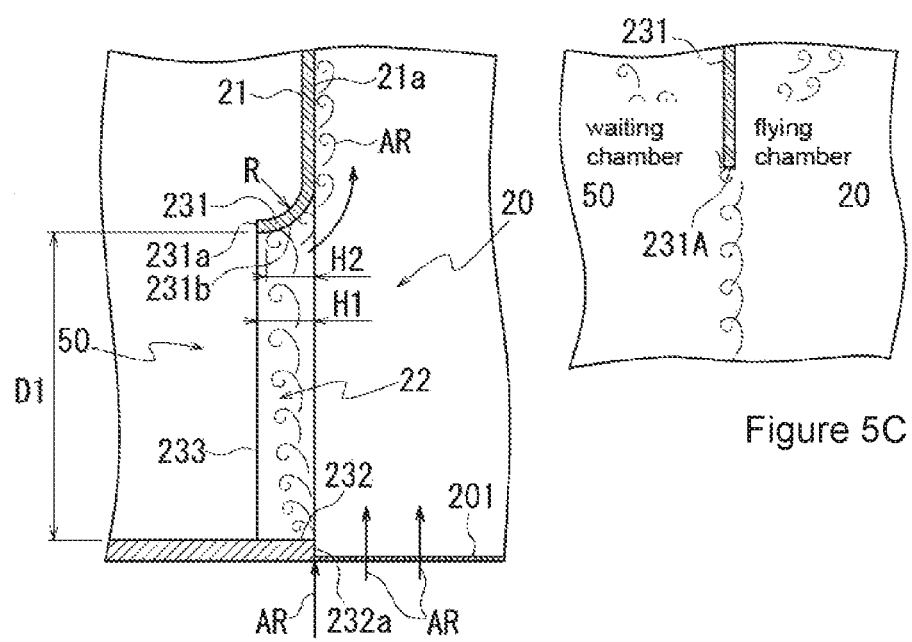
Figure 5C

VERTICAL WIND TUNNEL SKYDIVING SIMULATOR

CROSS-REFERENCE TO RELATED APPLICATIONS

This application is a continuation of U.S. application Ser. No. 15/789,234, filed on Oct. 20, 2017, which is a continuation of International Application No. PCT/GB2016/051137, filed Apr. 22, 2016, which claims priority to Japanese Application No. JP 2015-087187, filed Apr. 22, 2015, and GB Application No. 1511866.4, filed Jul. 7, 2015, the entire contents of each of which being fully incorporated herein by reference.

TECHNICAL FIELD

The present invention relates to a vertical wind tunnel skydiving simulator of the recirculating air type.

BACKGROUND ART

A vertical wind tunnel (VWT) is a wind tunnel which moves air up in a vertical column. Although vertical wind tunnels have been built for aerodynamic research, the most high profile are those used as recreational wind tunnels, frequently advertised as "indoor skydiving" or bodyflight, which have also become a popular training tool for skydivers. A recreational wind tunnel enables human beings to experience the sensation of flight without planes or parachutes, through the force of wind being generated vertically. Air moves upwards at approximately 195 km/h (120 mph or 55 m/s), the terminal velocity of a falling human body belly-downwards (lower speeds can be used for beginners; higher speeds for experts). A vertical wind tunnel is frequently called 'indoor skydiving' due to the popularity of vertical wind tunnels among skydivers, who report that the sensation is extremely similar to skydiving. The human body 'floats' in midair in a vertical wind tunnel, replicating the physics of 'body flight' or 'bodyflight' experienced during freefall.

Outdoor vertical wind tunnels can either be portable or stationary. Portable vertical wind tunnels are often used in movies and demonstrations, and are often rented for large events such as conventions & state fairs. Portable units offer a dramatic effect for the flying person and the spectators, because there are no walls around the flight area. These vertical wind tunnels allow people to fly with a full or partial outdoor/sky view. Outdoor vertical wind tunnels may also have walls or netting around the wind column, to keep beginner tunnel flyers from falling out of the tunnel.

Stationary indoor vertical wind tunnels include recirculating and non-recirculating types. Non-recirculating vertical wind tunnels usually suck air through inlets near the bottom of the building, through the bodyflight area, and exhaust through the top of the building. Recirculating wind tunnels, form an aerodynamic loop with turning vanes, similar to a scientific wind tunnel, but using a vertical loop with a bodyflight chamber within a vertical part of the loop. Recirculating wind tunnels are usually built in climates that are too cold for non-recirculating wind tunnels. The airflow of an indoor vertical wind tunnel is usually smoother and more controlled than that of an outdoor unit. Indoor tunnels are more temperature-controllable, so they are operated year-round even in cold climates.

Various propellers and fan types can be used as the mechanism to move air through a vertical wind tunnel. Motors can either be diesel-powered or electric-powered, and typically provide a vertical column of air between 6 and 16 feet wide. A control unit allows for air speed adjustment by a controller in constant view of the flyers. Wind speed can be adjusted at many vertical wind tunnels, usually between 130 and 300 km/h (80 and 185 mph, or 35 and 80 m/s), to accommodate the abilities of an individual and to compensate for variable body drag during advanced acrobatics.

There is an extensive patent literature in this area, with U.S. Pat. No. 4,457,509, dating from 1981, describes a 'Levitationarium' which has many of the features of a contemporary recirculating vertical wind tunnels. JP 2013-121536 A discloses a skydiving simulator in which an upward flow of air is formed in a flying chamber 516 in a recirculating ring-shaped wind tunnel. It is shown in FIG. 6: a skydiving simulator 500 is a recirculating wind tunnel 510 with two large loops, each loop forcing air up through the flying chamber 516 and recirculating it using a pair of large axial fans that force the air back around a large loop and up through the flying chamber 516. The recirculating wind tunnel 510 includes a first vertical duct 512 that feeds air upwards through the flying chamber 516; a pair of second vertical ducts 513, 513 disposed in parallel to the first vertical duct 512 and that bring the air downwards; left and right side horizontal ducts 514 at the top of the wind tunnel connect the first vertical duct 512 to the left and right side vertical ducts 513; left and right side horizontal ducts 515 form the lower loop of the wind tunnel.

In the first horizontal duct 514 located at the top of the recirculating wind tunnel 510, axial fan air blowers 520, 520 are disposed to send air AR to the second vertical ducts 513, 513, respectively. A recirculating air pathway 511 is formed.

The flying chamber 516, within which a flyer M flies, is situated in a section of the first vertical duct 512. In the flying chamber 516, the air AR from the blowers 520, 520 is adapted to move from below a floor surface 516a (typically a metal grid) to a ceiling 516b. One or more skilled flyers M can float upon and perform acrobatics on the high-speed moving air AR.

A doorway 516c, through which the flyer M enters and exits the flying chamber 516, is included in the side of the first vertical duct 512. But the doorway 516c can influence the flow of the air AR that is moving from the floor surface 516a side to the ceiling 516b side in the flying chamber 516, for example introducing turbulence, which can make the flyer flying within the flying chamber 516 feel uncomfortable about the airflow that is felt on his body. Reference may also be made to US2006/025227; this shows (item 1196) a small, flat air deflector bar on the entrance to the flight chamber, on the side facing the waiting chamber. There are other designs of air deflectors or impact protection placed around the entrance to the flight chamber, but these have little effect on reducing turbulence inside the waiting chamber.

It is very desirable to reduce or minimize the uncomfortable feelings due to air turbulence inside the waiting chamber, especially as vertical wind tunnels need to attract ordinary customers who are looking for an enjoyable recreational experience.

SUMMARY OF THE INVENTION

The invention is a vertical wind tunnel skydiving simulator including a flight chamber entrance that has a curved air deflector that extends into a waiting chamber, in which a convex surface of the curved air deflector faces across or towards the flight chamber entrance or into the flight chamber, and extends into the waiting chamber a sufficient distance to substantially reduce the flow of turbulent air into the waiting chamber.

We now summarize the core features implemented in a vertical wind tunnel skydiving simulator that uses this invention. Any one or more of these can be combined with any one or more other features.

The core implementation features are organized into the following six categories:
A. Minimizing turbulence features
B. Building construction features
C. Cooling features
D. Noise reduction features
E. Entertainment features
F. Organizing customers A. Minimizing Turbulence Features As noted above, a vertical wind tunnel skydiving simulator including a flight chamber entrance that has a curved air deflector that extends into a waiting chamber, in which a convex surface of the curved air deflector faces across or towards the flight chamber entrance or into the flight chamber, and extends into the waiting chamber a sufficient distance to substantially reduce the flow of turbulent air into the waiting chamber.

The curved surface is at the top of the entrance and can also be at the sides. The extent and exact shape the curved surface takes depends on various factors; the key principle however is that it has to be sufficient to substantially reduce or minimize the flow of turbulent air into the waiting chamber; the effect is to make it more comfortable and less noisy for people in the waiting area. This also helps to preserves the laminar, non-turbulent flow of air in the flying chamber, even across the flight chamber entrance. This makes flying more comfortable and predictable.

The curved surface may be curved in one dimension—e.g. cylindrically curved—along its vertical section; the convex surfaces then face across the mouth of the entrance to the flight chamber, or face into the flight chamber. Across the top of the entrance, the curved surface can be curved in a more complex fashion, e.g. curved in two or three dimensions, and their convex surfaces face downwards or into the flight chamber. The curved surface extends into the waiting chamber by an amount that substantially exceeds the width of the walls of the entrance and any protective padding around that entrance. The extent or width of the curved surface is at least as large as the turbulent flow that hits this surface—i.e. all turbulent flow passing up across the face of the entrance is captured by the curved surface(s). The degree of curvature is chosen so that the turbulent flow that hits the convex surface does not separate significantly from the convex surface. Consequently, the amount of turbulent air moving into the flight chamber is significantly reduced compared to earlier approaches.

By ensuring that the sides of the entrance to the flight chamber are curved in this way, it also ensures that the risk of injury if a skydiver hits the entrance is much reduced, since the skydiver is not impacting a sharp corner or edge, but instead a smooth surface against which any impact forces can be much reduced, especially as the skydiver can slide across the curved surface readily.

The curved surface is made of flexible and impact absorbing material; such as several layers of rubber, FRP and metal. The actual shape is a defined by a complex spline. There are other shapes and dimensions that also work well—a simple radius can work also, but perfect shapes from aerodynamic point of view are usually defined by a spline. The dimension should be comparable to a size of a turbulence and must fit the construction.

To re-cap, at the bottom edge of the flight chamber entrance, airflow separation occurs, leading to turbulent air passing up across the face of the flight chamber entrance; normally, without this invention, this turbulent air enters the waiting area and also hits the top edge of the flight chamber entrance, causing more turbulent air to enter both the waiting area and also the flight chamber; the turbulent air in the flight chamber can negatively affect the flying experience. With the invention, the flow of turbulent air into both the waiting area and also the flight chamber is significantly reduced.

The curved surface also eliminates the need for an air deflector in the flight chamber, positioned under the flight chamber entrance: air deflectors under the flight chamber entrance are normal for airtight flight chambers, but introduce some undesirable turbulence into the flight chamber. By adding the curved surface around the flight chamber entrance that extends into the waiting area, we not only remove the need for an air deflector under the flight chamber entrance and hence remove an object that contributes to turbulence in the flight chamber, but we also contribute to preserving the laminar, non-turbulent flow of air in the flying chamber, even across the flight chamber entrance.

Another feature that reduces turbulence is that the turning vanes positioned in the air ducts can be extra-large, with for example a 500 mm chord length, for greater efficiency in altering the airflow direction. Conventional turning vanes are much smaller, with for example a 200-300 mm chord length, but are less effective in altering air direction smoothly and without introducing turbulence. Larger turning vanes reduce pressure drop before and after the vanes making them more efficient than smaller turning vanes.

The turning vanes are made of extruded aluminium and are hence light and strong, and manufactured to a tightly controlled profile. There is 15 cm separation between adjacent vanes so that only small turbulence/eddies can pass between them—this, together with the extra large chord length, helps preserve the non-turbulent, laminar flow of air through the ducts and eventually into the flight chamber.

The airflow straighteners positioned under the flight chamber are made of stainless steel, thin-walled cells, e.g. with cells formed in a honeycomb arrangement. The cell width could take a range of sizes, such as approximately 129 mm, with 75 mm being the length of each hexagonal side; the depth of each cell is approximately 500 mm. However other cell dimensions, including much smaller dimensions, are also possible. The cell walls have 0.3 mm in thickness, but again far thinner cell walls, such as 0.05 mm can also be used, especially where a smaller cell is used. Typical earlier flow straighteners were made of plastic and hence the cell walls had to be significantly thicker, which introduces higher drag (and hence undesirable heating) and turbulence.

B. Building Construction Features

The chamber above the flight chamber is formed from fiber-reinforced plastic (FRP), such as fiberglass, and is shaped to enable a smooth transition from the circular x-section of the flight chamber to a rectangular x-section. FRP is an ideal material since it can be shaped into complex forms, allowing the smooth transition from a circular to square x-section, hence minimizing airflow turbulence. FRP is also relatively cheap to manufacture, even in complex shapes, and is light, making construction easier.

FRP also has good acoustic properties and reduces noise and vibration. The specific FRP used is a two layer FRP structure, approximately 90 mm thick, with a honeycomb of FRP joining the two outer layers of smooth FRP. Different dimensions are also possible.

The axial fans in the system are placed in vertical ducts; the chamber above the or each axial fan is also formed from fiber-glass FRP, shaped to enable a smooth transition from the rectangular x-section of the duct above the fan to the circular x-section of the fan chamber. This smooth transition minimizes airflow turbulence.

The flight chamber is at a lower pressure than atmospheric pressure; it is entered from a waiting area through an always-open entrance. The waiting area is separated from the main part of the building by a decompression chamber and there is an airtight door between the decompression chamber and the waiting area and there is another airtight door between the decompression chamber and the main part of the building. Adjacent to each door (or built into it or in the same wall as each door) is a pneumatic valve; so one valve is placed between the external area and the decompression chamber, and the other is placed between the waiting chamber and the decompression chamber. When both sealed doors of the decompression chamber are closed, the valve corresponding to the door which is going to be opened next is opened to smoothly equalize the pressure, to avoid damage to hearing.

There are two axial fans in the left side vertical column and two in the right side vertical column; but each axial fan sits inside its own duct. There are several advantages to this approach. First, mounting the axial fans in the vertical columns places less stress on the bearings, compared with the more common horizontal mounting. Including each axial fan in its own duct aids rapid and efficient construction since the axial fans can be pre-fabricated off site into a complete duct; at the construction site, a pair of separate ducts need only be assembled in position and next to one another.

Pressure sensors are positioned outside of the flight chamber and inside the flight chamber; the sensors continuously monitor air pressure and can shut down the entire system rapidly if air pressure in the flight chamber rises above a defined level. If the air pressure in the flight chamber starts equalizing to external pressure due to some reason, then the pressure in all other ducts can rise rapidly. Also, this rise in air pressure usually creates unexpected wind inside the whole building, which can damage some interior fittings, internal doors, windows etc. It is therefore safer to shut down the entire system, including the fans, since then the ducts will no longer be carrying high speed airflows. Shutting down the axial fans will reduce the velocity, and so the pressure difference and so the possible consequences. Note that we are concerned here with static pressure, not dynamic. When the fans are off, the pressure is equal to atmospheric everywhere. Higher the speed, lower the pressure inside the flight chamber compared to atmospheric. This is because the ducts with air inlets and outlets are not airtight and so the pressure on the top of the building is equalized to atmospheric. The rest of the loop is airtight, and so the pressure inside depends on air speed (see Bernoulli's Equation). The air speed in the wind tunnel is different everywhere. In the flight chamber it is maximal, and then it becomes lower and lower. The lowest speed is under the air jet. When something happens in the flight chamber, so it becomes not airtight, it will suck the air and equalize the pressure to atmospheric. The situation in other ducts of wind tunnel will depend on many factors (how much air is sucked into the flight chamber, how far the air inlets and outlets are opened, etc.) and generally is unpredictable. However, the resulting strong winds inside the building can damage interior, doors and windows $CO_2$ sensors in the flight chamber automatically open the air exchangers if $CO_2$ levels rise too high.

Fibre-optic lines connect each frequency controller to a fan; there is dual redundancy in all control lines.

A glass floor is built around a double-height flight chamber, at about half-way up. A glass floor enables us to maximize the available floor area; the total size e.g. footprint of the building may be restricted by zoning or planning laws, so a glass floor is an effective way of adding floor area without compromising on the aesthetics of a very tall space. The lower flight chamber has 4 m height and circular 4.5 m radius; the upper chamber also has 4 m height and expands from 4.5 m radius at its base. The glass floor is built at the top of the lower flight chamber and enables viewers to stand and watch flyers in the lower and upper flight chambers.

C. Cooling Features

The turning vanes have internal coolant channels. Because the turning vanes are unusually large, with for example a 500 mm chord length, the coolant channels can be large and hence carry a high volume of coolant, and there is also large surface area of turning vane; these factors combine to make the turning vanes very effective at cooling the air passing over them. The coolant channels in the vanes are designed to withstand high pressure (e.g. high pressure Freon at 10 ATM). There are leakage detectors adjacent to the cooling vanes detect leakage of coolant and automatically shut down the affected section of cooling vanes.

D. Noise Reduction Features

A large air exchanger in the top, horizontal ducts includes an air exhaust system formed by a large, horizontally hinged panel in the upper surface of the top, horizontal ducts. This arrangement minimizes noise pollution since the noise of the fans and moving air escapes is then directed upwards; conventional recirculating vertical wind tunnels often have air exhausts in the side or vertical ducts directing noise to people around the wind tunnel.

The air exchanger in the top ducts also includes an air inlet system formed by vertically hinged panels in the side (i.e. vertical) surfaces of the top ducts.

All of the vertical and horizontal ducts are mounted on vibration dampers (all ducts are vibration damped in this way, apart from the glass walls and the ducts at the bottom of wind tunnel).

Extra large axial fans are used. Each fan is approx. 3.5 m in diameter. Normal fans are typically 2 m-3 m in diameter. The general requirement for an axial fan in a wind tunnel is to pump the necessary volume flow, like X cu. meters per minute. And these requirements are all the same for tunnels with the same diameter of flying chamber. But a bigger diameter of axial fan requires less speed of air to provide the same volume mass flow. Slower air produce less noise. Bigger axial fan uses bigger blades, which are more effective and require less RPM. The extra energy of an inefficient blade is usually converted to noise. An edge of a blade is usually rotating at speeds very close to Mach 1, producing a significant amount of noise. A lower RPM of the axial results in a lower speed of the blade's edge and therefore lower noise. The same balancing technique of a rotor results in lower levels of vibration since it is rotating at lower speeds: they are rotating more slowly and so making less motor noise and vibration: Our fans are rotating at 600-850 rpm at max load, while normal fans are rotating at 800-1000 rpm. This lower rotational speed leads to less turbulent flow, so that air turbulence noise is less.

Noise sensors inside and outside of the facility continuously monitor noise levels for compliance with regulations, and the system can act to reduce noise when needed (e.g. reduce power automatically if air outlets need to be open; close air outlets automatically if power needs to be maintained)

E. Entertainment Features

UV lights are used to illuminate the flight chamber; UV reflective clothing or equipment is used by the flyers to reflect UV light when all of the ordinary lights are turned low/off for special lighting effects.

A matrix of RGB LEDs is used in the expansion chamber above the flight chamber for special lighting effects. The RGB LEDs can be used to give orientation for sportsmen inside the flying chamber (e.g. north/east/south/west sides may be coloured differently, so that flyers are always aware about their position during performance of complex tricks; for setting the tempo of performance (useful in multiple flyers training) and for training games, like 'touch the red spot'.

Lights are used to illuminate the turning vanes.

The seam or join between the glass panels surrounding the flight chamber include embedded lighting (e.g. LED strips). Embedding the lighting into the seams avoids the reflections that occur if they are outside of the glass panels.

Multiple cameras film the flight chamber to enable 3D reconstruction of the shape and movement of each flyer.

One or more depth sensors (e.g. Kinect) detect and model objects in the flight chamber to enable 3D reconstruction of the shape and movement of each flyer.

Helmets worn by flyers include an augmented reality display. Information (e.g. projected onto the normal transparent visor) can include time remaining to fly, instructions (e.g. a graphic indicating how to change position—especially useful when a group or team is practicing synchronized manoeuvres etc), real-time video of person flying so he can see mistakes or adjustments. The flyer can hence clearly see the flight chamber around him or her, but in addition can see the information on the augmented reality display. The helmet can be linked to RFID tag that is worn by the flyer to uniquely identify that flyer to the system that provides the real-time information to the helmet-based augmented reality display.

Helmets worn by flyers provide an immersive 3D reality on an integrated high resolution display, such as an Oculus Rift. Immersive reality can provide real-time video images of the flyer, generated by cameras and depth sensors, real-time video images of an instructor, video images of virtual scenes (e.g. jumping from plane, passing close to other flyers, manoeuvres with other flyers in a skydiving team, a parachute deploying etc.). So the flyer no longer views the flight chamber around him or her (although a real-time video of that could be streamed from a helmet mounted camera), but instead views only the scene generated by the immersive reality system. The helmet can be linked to a RFID tag that is worn by the flyer to uniquely identify that flyer to the system that provides the real-time information to the helmet-based augmented reality display.

F. Organizing Customers

Flyers wear RFID tags (e.g. on helmets or suits). The RFID tags enable a computer-implemented system to know who is where in the building (e.g. in decompression chamber, in waiting area, in flight chamber, somewhere else); this enables:

control of the time spent in the decompression chamber, in the waiting area, in the flight chamber;

control of when each session starts, when a flyer enters the decompression chamber, and then the waiting area, and then the flight chamber;

automatic setting of appropriate airspeed, and lighting;

automatic sending of flyers photos/videos to correct destination (email, FB account etc.);

power consumption for different clients and types of client (e.g. novice, mid-level, experienced sportsman etc.) to be known, which in turn enables optimization of costs charged to each type of client.

RFIDs are also useful when there are several flyers in the chamber as the computer implemented billing system can then automatically charge either a single flyer for the session, or share the cost equally amongst all the flyers, or some other permutation. Display screens in the centre will show timetable and timeline of all events also.

Flyers each wear vibration alert devices (e.g. wrist-mounted vibration devices, or an app running on a smartwatch with a vibration function). This allows flyers to be informed with a vibration alert when they need to move to the decompression area, prepare to enter flight chamber, exit flight chamber etc. High noise levels and/or ear plugs used by flyers can make it hard for them to hear spoken instructions.

Dynamic pricing for flying sessions is possible. Pricing will be based on various parameters, such as loading, time of day, whether marketing is planned prior to the sessions, and other events affecting popularity.

IP telephony integration is provided. This enables someone handling an incoming call from a customer to have that customer automatically identified using caller ID and for that customer's records to be automatically and immediately displayed to the call handler, giving the background, history and any specific needs of that customer.

BRIEF DESCRIPTION OF DRAWINGS

FIGS. 3(A) and 3(B) illustrate the structure of a flow straightener according to the embodiment.

FIGS. 4(A) to 4(C) illustrate the structure of a flow straightener according to the embodiment.

FIG. 5(A) to 5(C) illustrate the structure of a waiting chamber and a decompression chamber according to the embodiment, and shows that the flight chamber entrance has a curved surface that extends into the waiting chamber; this curved surface is designed to minimize the flow of turbulent air into the waiting chamber.

DETAILED DESCRIPTION

Figure 1:
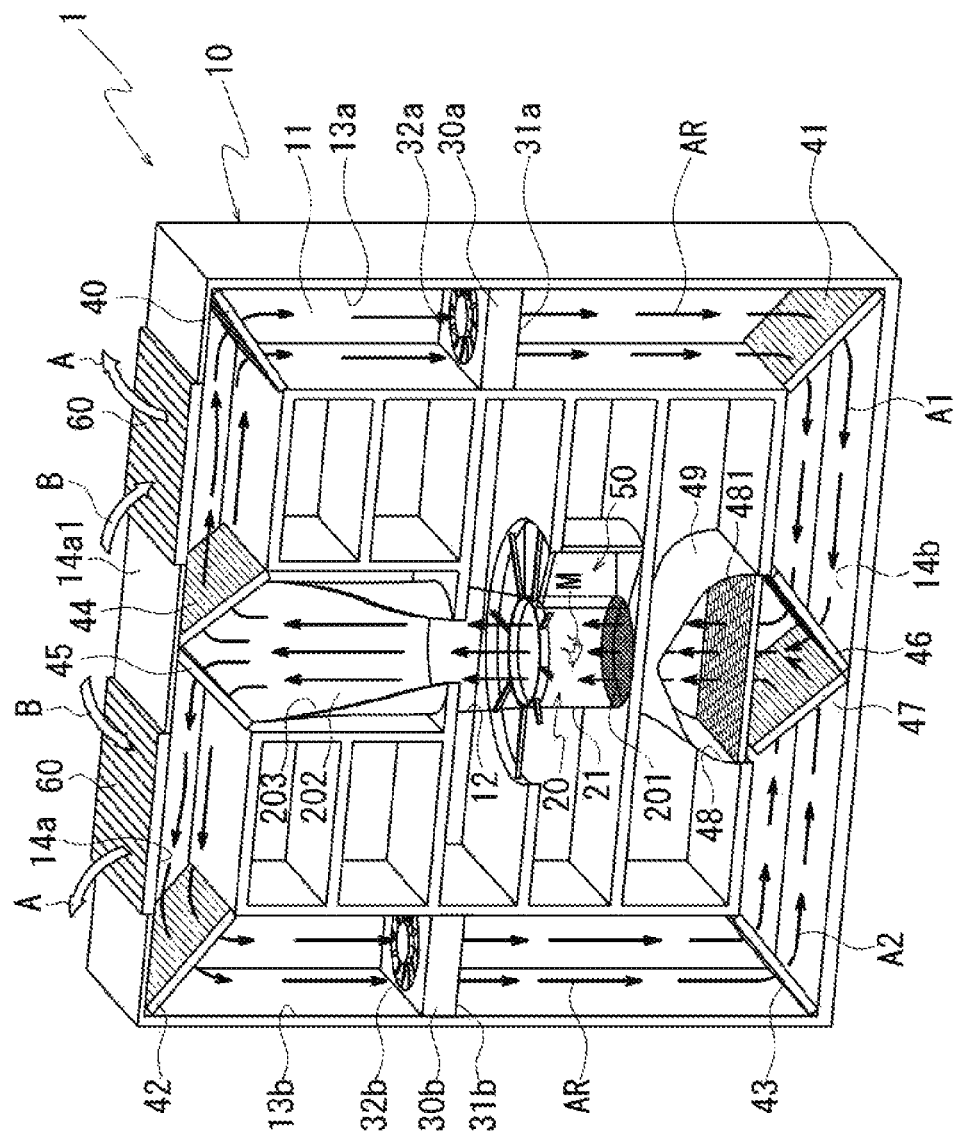
FIG. 1 illustrates the structure of a skydiving simulator according to an embodiment.

A skydiving simulator 1 according to an embodiment will now be described. FIG. 1 is a schematic cross-sectional view illustrating the structure of the skydiving simulator 1.

Overview

As shown in FIG. 1, the skydiving simulator 1 is made up of: a first vertical duct 12, that includes a glass-walled flying chamber 20; air moves upwards in this first vertical duct 12.

The simulator includes a pair of right and left side second vertical ducts 13a, 13b through which air passes downwards and which are parallel to the first vertical duct 12. A first horizontal duct 14a is at the top of the structure and has left and right sides, and connects the first vertical duct 12 to the right and left side second vertical ducts 13a, 13b. A second horizontal duct 14b is at the bottom of the structure and connects the right and left side second vertical ducts 13a, 13b with the central vertical duct 12.

The first vertical duct 12, the second vertical ducts 13a, 13b, the first horizontal duct 14a, and the second horizontal duct 14b form a recirculating wind tunnel 10 having a generally square or rectangular shape. Air AR can therefore move in a circulating pathway 11 in the recirculating wind tunnel 10.

The flying chamber 20, within which a flyer M flies, is situated in a section of the first vertical duct 12 that has glass walls.

The flying chamber 20 is a region defined by a cylindrical surrounding wall 21 and is provided with a mesh member (safety net) floor 201. Air moving at high speed passes up through the mesh floor 201.

The sidewalls of flying chamber 20 extend vertically to an upper part of the first vertical duct 12. The duct then reaches a section 203 that is formed in an upper section 202 of the flying chamber 20; the width of this section widens considerably so that the airspeed in it drops to below that needed to support a flyer; a flyer can hence not rise to the top of section 203. The shape of section 203 smoothly alters from a circular cross-section to a square cross-section.

Hence, the velocity of the air AR flowing upward within the flying chamber 20 is slowed down as it passes through the widening section 203. The diametrical cross-sectional area of the widening section 203 in the vicinity of turning vanes 44, 45, which turn the air through 90°, is set to be a size sufficient to reduce the velocity of the air AR to an extent that the flyer M flying within the flying chamber 20 is kept from bumping against the turning vanes 44, 45.

The second vertical ducts 13a and 13b, which take the air downwards are parallel to the first vertical duct 12, and are equidistant to the first vertical duct 12.

Blowers 30a, 30b for sending the air AR are disposed in respective longitudinal sections of the second vertical ducts 13a, 13b, with their respective discharge ports 31a, 31b facing downwards in the second vertical ducts 13a, 13b.

The blowers 30a, 30b are in the form of an axial blower having air intakes 32a, 32b and discharge ports 31a, 31b, respectively, about respective common central axes.

Blowers 30a and 30b for delivering the air AR are provided at approximately the middle of the second vertical ducts 13a, 13b (i.e. half way up or down each duct).

Due to the above configuration, the air AR exiting the blowers 30a, 30b flows along the recirculating pathway 11 formed in the recirculating wind tunnel 10, then into the flying chamber 20 provided in the first vertical duct 12.

In the recirculating pathway 11, a length that the air AR travels from the blower 30a to the flying chamber 20 and a length that the air AR travels from the blower 30b to the flying chamber 20 are set to be equal.

Therefore, the difference between a volume of the air AR from the blower 30a and a volume of the air AR from the blower 30b when the two airstreams merge at section 48 disposed in the first vertical duct 12 should be minimal; turbulent flow is reduced and the airflow across the width of the flight chamber 20 is therefore largely uniform.

The Turning Vanes

As shown in FIG. 1, there are multiple turning vanes 40 to 47 in the recirculating wind tunnel 10 that smoothly change the direction of the air AR through 90° at each corner of the recirculating pathway 11.

The turning vanes 41 and 43 are disposed at connections between the lower sections of the second vertical ducts 13a, 13b and the second horizontal duct 14b, respectively. The turning vanes 46, 47 are disposed at a connection between the second horizontal duct 14b and the lower section of the first vertical duct 12.

Further, the turning vanes 40, 42 are disposed at connections between the upper sections of the second vertical ducts 13a, 13b and the first horizontal duct 14a, respectively. The turning vanes 44, 45 are disposed at connection between the first horizontal duct 14a and the upper section of the first vertical duct 12.

The turning vanes 40 and 41 are alter the direction of the air AR in the second vertical duct 13a, while the turning vanes 42 and 43 alter the direction of the air AR in the second vertical duct 13b.

The turning vanes 44 and 45 alter the direction of the air AR in the first horizontal duct 14a, while the turning vanes 46 and 47 alter the direction of the air AR in the second horizontal duct 14b.

The essential shape and structure of the turning vanes 40 to 47 are substantially the same; therefore, the turning vane 41 disposed at the connection between the lower section of the second vertical duct 13a and the second horizontal duct 14b will be represented in the following description, while other turning vanes 40, 42 to 47 will be described on an as-needed basis.

Figure 2A:
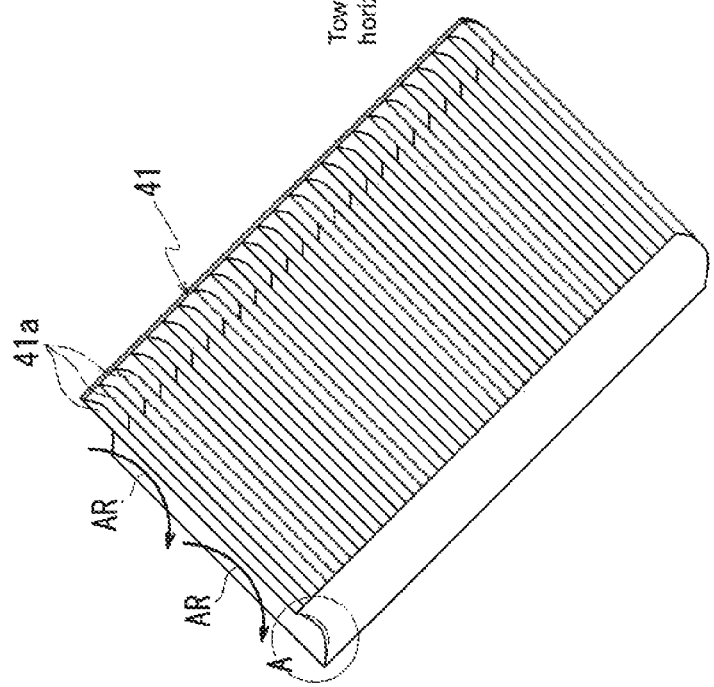
FIGS. 2(A) and 2(B) illustrate a configuration of turning vanes according to the embodiment.
Figure 2B:
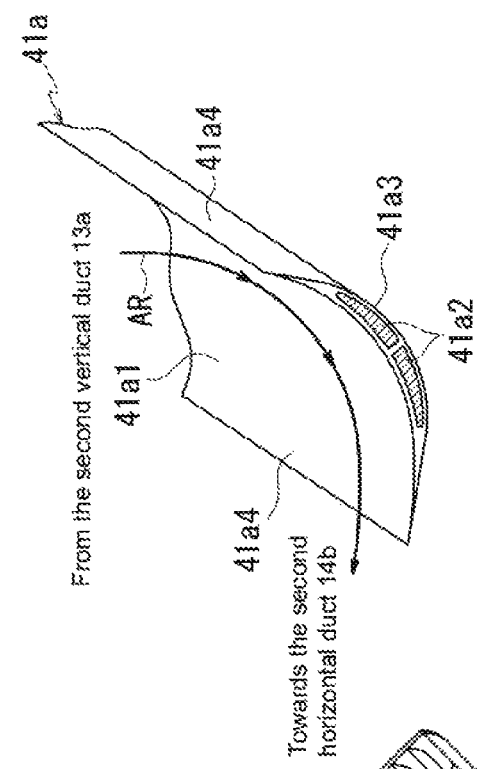
Figure 6:
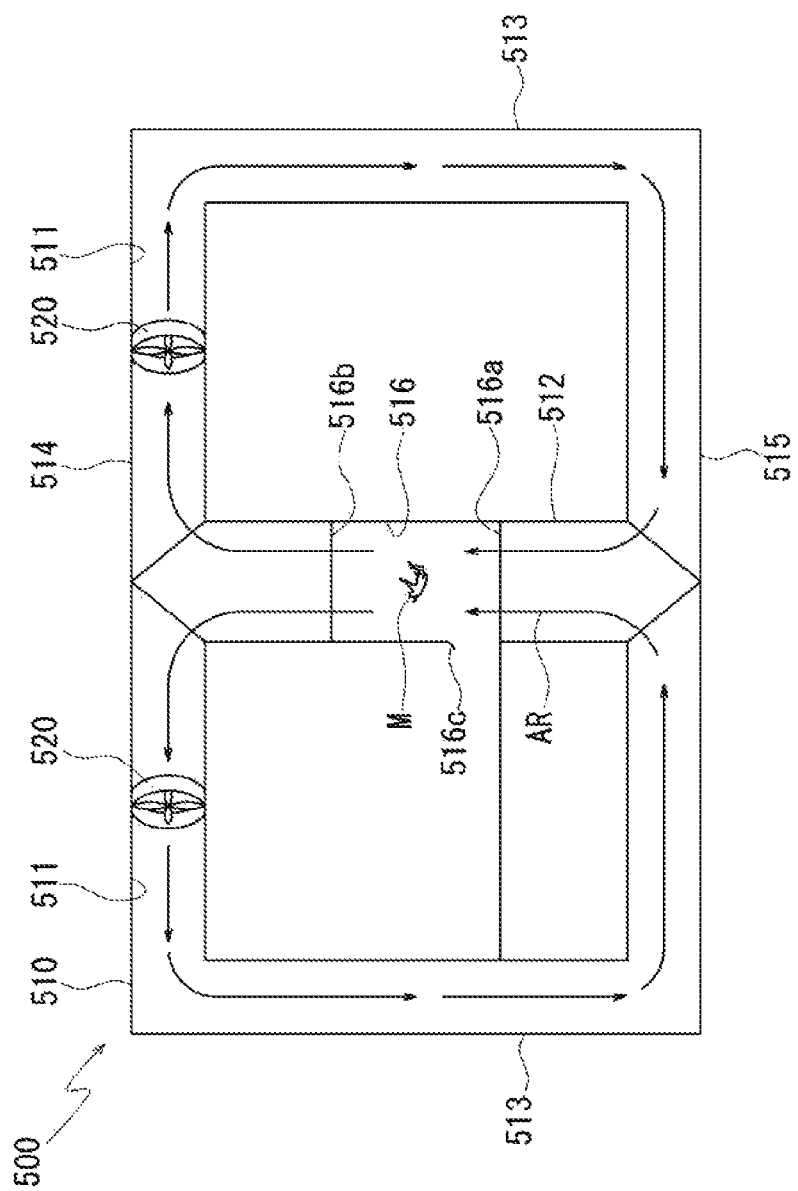
FIG. 6 is a schematic cross-sectional view illustrating a prior art skydiving simulator.

FIGS. 2(A) and 2(B) illustrate the turning vane 41: FIG. 2(A) is a schematic perspective view showing the turning vane 41, and FIG. 2(B) is an enlarged cross-sectional view of region A in FIG. 2(A).

As shown in FIG. 2(A), in the turning vanes 41, a plurality of vane members 41a is disposed in parallel to each other in the thickness direction at regular intervals.

As shown in FIG. 2(B), the individual vane member 41a has a curved shape in which a middle portion 41a3 is thicker than the edges of the vane; the leading edge of the vane presents a sharp, low drag face to the incoming airstream.

Due to this configuration, the air AR exiting the blower 30a and flowing downward through the second vertical duct 13a is redirected along the curvature of the base 41a1 of multiple directing vane members 41a disposed transversely to the flow of air AR through the second vertical duct 13a to flow toward the first vertical duct 12 side in the second horizontal duct 14b (see a pathway A1 in FIG. 1 and the arrows in FIG. 2(B)). In this way, the turning vanes efficiently re-direct the air through 90°.

The middle portion 41a3 of the base 41a1 of the vane member 41a is thicker than the leading and trailing edges 41a4, 41a4 of the vane member 41a, and includes a pair of channels 41a2 along the length of the vane member 41a; the channels are separated by a spar that give rigidity to the vane.

The channels 41a2 serves as a passage through which a cooling fluid is passed to effect overall cooling of the vane member 41a.

In the embodiment, the air AR from the blowers 30a, 30b is recirculated along the recirculating pathway 11 in the recirculating wind tunnel 10, producing friction between the recirculating air AR and inner wall surfaces of the recirculating wind tunnel 10.

Consequently, the temperature of the air AR gradually increases due to frictional heat generated between the air AR and the inner wall surfaces of the recirculating wind tunnel 10 during recirculation of the air AR in the recirculating wind tunnel 10. When the temperature of the air in the recirculating wind tunnel 10 becomes too high, the flyer M within the flying chamber 20 will have difficulty in flying.

In the configuration mentioned above, as the air AR changes its direction passing over the turning vane, heat is exchanged between the air AR and the cooled bases 41a1, such that the temperature of the air AR is lowered to a temperature suitable for flight.

The cooling fluid can be chlorofluorocarbons (CFCs), long life coolants (LLCs), or the like. The generic term, chlorofluorocarbon, is used in the specification because "Freon" is a registered trademark of DuPont (U.S.).

The Flow Straightener

Next, a flow straightener 481 will be described, which is disposed in the wide section 48 in the first vertical duct 12, just underneath the flight chamber 20.

FIGS. 3(A) and 3(B) illustrate the flow straightener 481. FIG. 3(A) is a schematic perspective view of a portion of the flow straightener 481, and FIG. 3(B) is a schematic perspective view of a tubular member 482 constituting the flow straightener 481.

As shown in FIGS. 3(A) and 3(B), in the flow straightener 481, multiple tubular members 482, each having an opening that is substantially hexagonal seen cross-sectionally, is in contact with each other side 482b to side 482b, allowing no gap to be formed there between. In other words, the flow straightener 481 has a so-called "honeycomb" structure which is resistant to longitudinal (axial) compression stresses.

The flow straightener 481 is disposed across the flow cross section of the first vertical duct 12; the tubular members 482 are oriented so that its openings 482a are aligned in the direction of the airflow AR (see FIG. 1).

Turbulent airflow is substantially reduced as the air passes up through the flow straightener 481 made up of the honeycomb grid of tubular members 482.

It should be noted that a flyer flying in this type of skydiving simulator can have a certain feeling (an uncomfortable or sickening feeling) which is different from one felt by a skydiver descending from an aircraft. The inventors conducted a study to figure out the cause for this and have found that a flyer will have an uncomfortable or sickening feeling when a turbulent flow is present in the airflow in the flight chamber 20.

As mentioned above, in the embodiment, the flow straightener 481 is provided below the flying chamber 20 so that the turbulent air AR is straightened through the flow straightener 481 before being sent into the flying chamber 20. In this way, the straightened, non-turbulent air AR will contact the flyer M; this reduces the uncomfortable or sickening feeling that can be felt by the flyer M within the flying chamber 20.

The Narrowing Section

As shown in FIG. 1, between the flying chamber 20 and the flow straightener 481 in the first vertical duct 12, there is a narrowing section 49, in which the flow cross section of the first vertical duct 12 becomes smaller in the airflow direction. The narrowing section 49 is above the flow straightener 481.

In the embodiment, it is configured that the flying chamber 20 is directly after the narrowing section 49 in the direction of the flow of air AR (the direction of arrows in FIG. 1). The air AR substantially increases its velocity as it passes through the narrowing section 49. Because the air AR with increased velocity is sent into the flying chamber 20 immediately after the narrowing section 49, the air AR has an airspeed (e.g. 120 m.p.h) sufficient to support the flyer M in the flying chamber 20 and broadly similar to the terminal velocity experienced by a skydiver in the belly-down free-fall position.

In the flying chamber 20, a balance is kept between the force lifting up the flyer M by the flow of the air AR and the force pulling down the flyer M due to the weight of the flyer M; the balance can be altered by the skydiver changing his or her shape, enabling the skilled skydiver to perform complex acrobatics in the flight chamber.

The Waiting Chamber

A waiting chamber 50 provided outside the flying chamber 20 will now be described.

FIGS. 4(A) to 4(C) illustrate the waiting chamber 50 and a decompression chamber 57; FIG. 4(A) is a schematic perspective view around the waiting chamber 50, decompression chamber 57, and flying chamber 20; FIG. 4(B) is a schematic plan view around the waiting chamber 50, decompression chamber 57, and flying chamber 20 seen from above; and FIG. 4(C) is a cross-sectional view of a surrounding wall 21 around an LED device 211, taken along the plane A of FIG. 4(A).

FIGS. 5(A) to 5(C) illustrate a frame member 23 surrounding a doorway 22; FIG. 5(A) is a front view around the doorway 22 seen from the flying chamber 20; FIG. 5(B) is a cross-sectional view taken along the line A-A of FIG. 5(A); and FIG. 5(C) illustrates a conventional embodiment of a top frame 231 of the frame member 23.

FIG. 4(C) is included in order to explain the LED devices (light-emitting devices). FIGS. 5(A) to 5(C) are included in order to explain the structure of the doorway 22.

As shown in FIGS. 4(A) and 4(B), outside the flying chamber 20, the waiting chamber 50 surrounds the flying chamber 20.

The waiting chamber 50 is separated by a surrounding wall 21 surrounding the flying chamber 20 when viewed from the upper section of the first vertical duct 12, and by an outer wall 52 at a predetermined distance external to the surrounding wall 21.

An entrance 22 to the flight chamber 20 is provided in the surrounding wall 21. The doorway 22 allows communication between the waiting chamber 50 and the flying chamber 20, enabling the flyer M to enter and exit the flying chamber 20.

Seen from inside the flying chamber 20, the doorway 22 has a rectangular shape in which, in its vertical direction, it is bilaterally symmetrically relative to a diametric line X of the cylindrical surrounding wall 21 (see FIG. 4(B) and FIG. 5(A)).

Turbulence is generated due to separation of the air at all four edges of the doorway 22.

To reduce this turbulence, the shape of the frame 23 surrounding the doorway 22 is devised so as to reduce the influence of the turbulent flow generated at the doorway 22.

Specifically, a top frame 231 along the top edge of the doorway 22 and side frames 233, 233 extending from the opposite ends of the top frame 231 downward toward a bottom frame 232, are respectively curved outwardly from the flying chamber 20 (i.e., toward the waiting chamber 50) to form the frame 23. As noted earlier, the flight chamber entrance that has a curved air deflector that extends into a waiting chamber, in which a convex surface of the curved air deflector faces downwards or into the flight chamber and extends into the waiting chamber a sufficient distance to substantially reduce the flow of turbulent air into the waiting chamber.

The turbulent flow generated at the bottom frame 232 will now be described.

As shown in FIG. 5(B), laminar flow of the air AR moving upward in the flying chamber 20 and passing over the bottom frame 232 of the doorway 22 breaks down as the air passes over the bottom frame 232 and, as a result of this, turbulent flow is generated at the bottom edge 232a of the frame 232.

The turbulent flow thus generated moves toward the top frame 231.

Here, when the top frame 231 is not formed to have a curved, convex shape as is shown in FIG. 5(C), the turbulent flow that collides against an end 231A of the top frame 231 passes into both the flying chamber 20 and the waiting chamber 50. The turbulent flow that passes into the flying chamber 20 exerts an influence on the feeling felt by the flyer within the flying chamber 20 and can cause the flyer to have an uncomfortable feeling. The turbulent flow that passes into the waiting chamber 50 causes a slight vibration in the air in the waiting chamber that can cause the next flyer waiting in the waiting chamber 50 to have an uncomfortable feeling.

In the embodiment, as shown in FIG. 5(B), the top frame 231 is curved in a direction in which the distance D1 between the top frame 231 and the bottom frame 232 becomes smaller towards an end 231a of the top frame 231, such that the end 231a is situated inside the waiting chamber 50. Curved, convex surface 231b faces the bottom frame 232.

In this way, when the turbulent flow generated at the bottom frame 232 moves to the top frame 231 and reaches the curved surface 231b, it moves toward the flying chamber 20, and not toward the waiting chamber 50.

Almost all turbulent flow reaching the top frame 231 will move upward into the flying chamber 20 along the curved surface 231b, without moving into the waiting chamber 50.

Curvature radius R of the curved surface 231b is set so that the turbulent flow moving along the curved surface 231b does not separate significantly from the curved surface 231b.

Furthermore, because the airflow that becomes turbulent by colliding against the bottom frame 232 tends to move toward the waiting chamber 50 as it is moving toward the top frame 231, a distance H1 of the curved surface 231b, measured from an inner wall surface 21a of the surrounding wall 21 to the end 231a of the curved surface, is set to be greater than the width H2 of the turbulent flow that reaches the top frame 231.

Consequently, much of the air that becomes turbulent by colliding against the bottom frame 232, upon reaching the curved surface 231b of the top frame 231, moves along the curved surface 231b and up along the inner wall surface 21a of the surrounding wall 21 inside the flight chamber 20.

Thus, the air AR that becomes turbulent by colliding against the bottom frame 232 does not move in towards the waiting chamber 50; this prevents the uncomfortable or sickening feeling felt by a flyer waiting in the waiting chamber 50 that would occur if turbulent air does pass into the waiting chamber 50.

Further, as shown in FIG. 4(B), the sides of the entrance 22 to the flight chamber 233, 233 are also curved in a direction in which a distance D2 between the side frames becomes smaller toward ends 233a, 233a of the opening, such that the ends 233a, 233a are situated inside the waiting chamber 50; the curved convex portions 233b, 233b face the side frames, respectively.

Consequently, when the air AR moving upward in the flying chamber 20 collides against the curved portions 233b, 233b of the side frames 233, 233, the air AR is allowed to flow smoothly along the surfaces of the curved portions 233b, 233b, advantageously preventing turbulent flows from generating.

Further, because the top frame 231 and the side frames 233 of the frame 23, through which the flyer M enters and exits, are curved with their respective ends 231a, 233a being situated in the waiting chamber 50 (see the curved surface 231b in FIG. 5(B) and the curved surface 233b in FIG. 4(B)), even if the flyer M bumps against the curved surfaces during flight, the impact is reduced.

As shown in FIG. 4(A), the waiting chamber 50 is provided in a small area at the lower section side of the flying chamber 20 at the floor level 201 of the flying chamber 20. The surrounding wall 21 surrounding the flying chamber 20 and the ceiling 56 of the waiting chamber 50 are formed by a transparent member (for example, an FRP or an acrylic resin).

Consequently, the next flyer waiting his turn in the waiting chamber 50 can readily watch the way the flyer M is flying in the flying chamber 20 through the surrounding wall 21 and the ceiling 56 formed out of a transparent member.

In the embodiment, the ceiling 56 of the waiting chamber 50 serves also as a floor of the second floor of the skydiving simulator 1, allowing an observer to stand on the ceiling 56 of the waiting chamber 50. Thus, through the ceiling 56 formed with a transparent member, the observer can watch the way the flyer M is flying in the flying chamber 20 from above.

As shown in FIGS. 4(A) and 4(C), the surrounding wall 21 surrounding the flying chamber 20 is provided with a plurality of lighting devices (LED devices 211) along its circumference. The LED devices 211 are recessed in the thickness of the surrounding wall 21, with its light emitting surfaces 211a facing the inside of the flying chamber 20.

It is noted that the LED devices 211 do not pass fully through the surrounding wall 21 into the flying chamber 20, but a thickness H3 of the surrounding wall 21 is kept between the LED devices 211 and the flying chamber 20 (see FIG. 4(C)).

If the LED devices 211 protrude into the inside of the flying chamber 20 from an inner wall surface 21a of the surrounding wall 21, the LED devices 211 will disturb the flow of the air AR moving upward in the vicinity of the inner wall surface 21a of the surrounding wall 21. On the other hand, when the LED devices 211 are disposed on an outer wall surface 21b of the surrounding wall 21, the light emitted from the light emitting surfaces 211a of the respective LED devices 211 will be irregularly reflected in the thickness of the surrounding wall 21 formed with a transparent member; consequently, the LED devices 211 are not able to illuminate the inside of the flying chamber 20 properly.

In the embodiment, the LED devices 211 are therefore recessed into the thickness of the surrounding wall 21 in the manner that a predetermined thickness H3 is kept between the light emitting surfaces 211a of the respective LED devices 211 and the flying chamber 20. In this way, the LED devices 211 are not protruding into the inside of the flying chamber 20, and thus the LED devices 211 do not disturb the flow of the air AR moving in the vicinity of the inner wall surface 21a.

The thickness H3 of the surrounding wall 21, where the LED devices 211 are disposed, is thinner than a thickness H4 of the other part of the surrounding wall 21 (H3<H4). Therefore, the light emitted from the light emitting surfaces 211a of the respective LED devices 211 is readily transmitted through the surrounding wall 21 having the thickness H3 so as to illuminate the inside of the flying chamber 20 properly.

Decompression Chamber

A decompression chamber 57 is adjacent to the waiting chamber 50.

As shown in FIG. 1, the diameter of the first vertical duct 12 is smallest at the flying chamber 20. Consequently, the velocity of the air AR is highest as it enters the flying chamber 20, and the air pressure within the flying chamber 20 and the waiting chamber 50 that is in communication with the flying chamber 20 are lower than the pressure outside the first vertical duct 12 (i.e., atmospheric pressure). Therefore, when the flyer M abruptly exits the flying chamber 20 or the waiting chamber 50 to the outside of the first vertical duct 12 (i.e., an environment under atmospheric pressure), he may have an uncomfortable feeling due to the pressure difference.

In order to reduce this pressure difference associated with the flyer M's entering and exiting the waiting chamber 50 (the flying chamber 20), the skydiving simulator 1, as shown in FIGS. 4(A) and 4(B), is provided with a decompression chamber 57 between the waiting chamber 50 and the outside of the first vertical duct 12.

The decompression chamber 57 is air-tight, and is defined by an outer wall 52 and an inner wall 53 of the waiting chamber 50.

The inner wall 53 separates the decompression chamber 57 from the waiting chamber 50 and is provided with a pressure-resistant door 54 for allowing and disallowing communication between the decompression chamber 57 and the waiting chamber 50. The outer wall 52 separates the decompression chamber 57 from a space outside the first vertical duct 12 and is provided with a pressure-resistant door 55 for allowing and disallowing communication between the decompression chamber 57 and the space outside the first vertical duct 12.

Thus, the decompression chamber 57 is separated from the waiting chamber 50 and the space outside the first vertical duct 12 by the airtight pressure-resistant doors 54, 55; therefore, when both of the pressure-resistant doors 54, 55 are closed, the pressure in the decompression chamber 57 is maintained constant.

In the skydiving simulator 1, the pressure-resistant doors 54, 55 are controlled so that they cannot be open at the same time, in order to prevent air in the waiting chamber 50 from leaking outside the first vertical duct 12 by way of the decompression chamber 57.

For example, when a flyer who finishes flying intends to exit the waiting chamber 50 to go outside the first vertical duct 12, he opens the pressure-resistant door 54, i.e., the second of the two pressure-resistant doors, with the pressure-resistant door 55, i.e., the first of the two pressure-resistant doors, being shut, to enter the decompression chamber 57. Then, he closes the second pressure-resistant door 54 and gradually turns up the pressure in the decompression chamber 57 to the pressure outside of the first vertical duct 12 (i.e., atmospheric pressure). Finally, the flyer M opens the first pressure-resistant door 55 with the second pressure-resistant door 54 being shut to go outside the first vertical duct 12.

In this way, the flyer M gets accustomed to the pressure difference between the pressure in the waiting chamber 50 (the flying chamber 20) and atmospheric pressure before going outside the first vertical duct 12; therefore, an uncomfortable feeling due to an abrupt pressure change is eased.

As mentioned above, in the skydiving simulator 1, the first pressure-resistant door 55 is always kept shut while the second pressure-resistant door 54 is open.

In this way, when a flyer who finishes flying intends to exit the waiting chamber 50 to go outside the first vertical duct 12, the waiting chamber 50 and the outside of the first vertical duct 12 are not in direct communication with each other; therefore, the air in the waiting chamber 50 does not leak outside the first vertical duct 12.

Consequently, the next flyer waiting for his turn is now able to fly without being influenced by the first flyer's exiting from the waiting chamber 50.

Furthermore, the outer wall 52 and the inner wall 53 defining the decompression chamber 57 include multiple pressure regulators 571 (more than two in the embodiment) so that when the pressure in the decompression chamber 57 exceeds a predetermined value, it is lowered to a set value by actuation of the regulators 571. This prevents overpressuring in the decompression chamber 57.

In turn, when a next flyer waiting for his turn intends to enter the waiting chamber 50 from the outside of the first vertical duct 12, he opens the first pressure-resistant door 55 with the second pressure-resistant door 54 being shut to enter the decompression chamber 57. Then, he closes the first pressure-resistant door 55 and gradually turns down the pressure in the decompression chamber 57 from atmospheric pressure to a pressure substantially the same as the pressure inside the flying chamber 20. Finally, the flyer M opens the second pressure-resistant door 54 with the first pressure-resistant door 55 being shut to enter the waiting chamber 50.

In this way, the flyer M gets accustomed to the pressure difference between the pressure in the waiting chamber 50 and the pressure outside the first vertical duct 12 before entering the waiting chamber 50; therefore, there should be no an uncomfortable feeling felt by the flyer due to an abrupt pressure change.

As mentioned above, in the skydiving simulator 1, the second pressure-resistant door 54 is always kept shut while the first pressure-resistant door 55 is open.

In this way, the waiting chamber 50 and the outside of the first vertical duct 12 are not in direct communication with each other; therefore, the air in the waiting chamber 50 does not leak outside the first vertical duct 12.

Consequently, the flyer M who is flying currently is able to continue the flight without being influenced by the next flyer's entering into the waiting chamber 50.

Cooling Ventilator

A cooling ventilator 60 is an apparatus for changing the air AR flowing through the recirculating wind tunnel 10 for fresh air from the outside of the recirculating wind tunnel 10, and also for cooling the air AR that is heated due to frictional heat generated between the air AR and the inner wall surfaces of the recirculating wind tunnel 10 during recirculation of the air AR in the recirculating wind tunnel 10.

As shown in FIG. 1, ventilators 60 are provided on the upper wall 14a1 of the first horizontal duct 14a. The ventilator 60 is configured to permit opening and closing of a portion of the upper wall 14a1 such that the old air AR in the wind tunnel 10 is released into the atmosphere (see an arrow A in FIG. 1) and in turn fresh atmospheric air is taken into the wind tunnel 10 (see an arrow B in FIG. 1) simultaneously.

As mentioned above, the cooling ventilator 60 operates to release the air AR flowing through the recirculating wind tunnel 10 into the atmosphere as well as to cool down the temperature of the air AR that is heated during recirculation in the recirculating wind tunnel 10 by taking fresh air from the atmosphere into the recirculating wind tunnel 10.

It should be noted that ventilation of the recirculating wind tunnel 10 by the cooling ventilator 60 is performed not only when the flyer M is flying but also when the flyer M is not flying. In the latter condition, the blowers 30a, 30b need not send the air AR at the velocity needed for flying in the flight chamber 20; the blowers 30a, 30b can then be operated at a lower rotational speed, reducing the noise they make.

Safety Mesh

Figure 7:
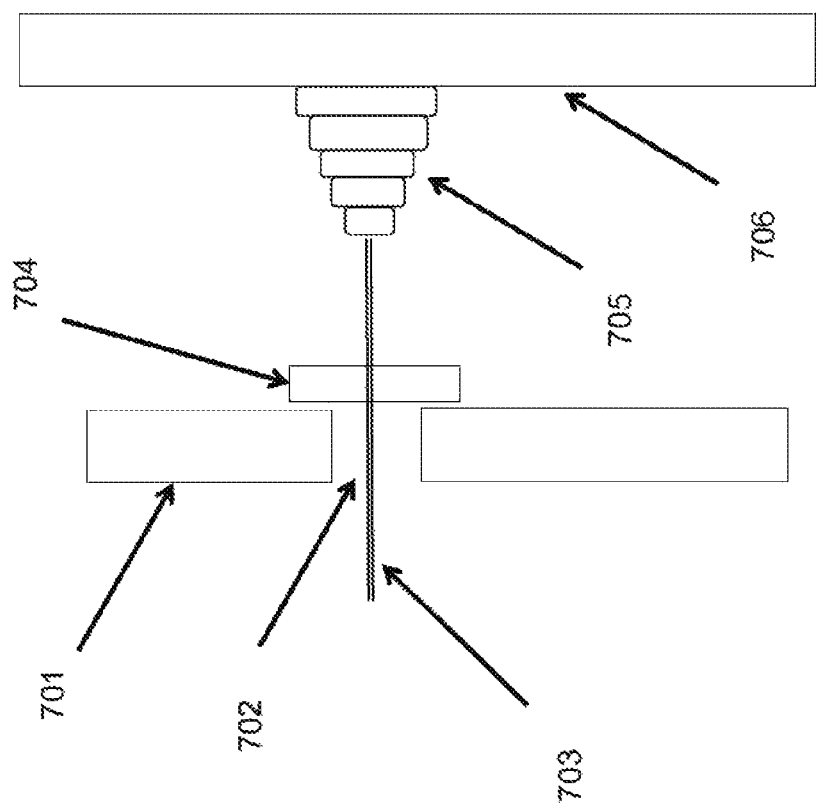
FIG. 7. is a schematic cross-sectional view illustrating the safety mesh secured by ropes that each pass through a narrow, vertical slot in the flight chamber wall and are then secured to an outer wall with a long-stroke spring.

Conventional safety meshes are secured directly to the flight chamber wall and so provide very little impact absorbing deformation if a skydiver impacts fast and hard close to the wall of the flight chamber, leading to a real risk of injury. FIG. 7 is a cross-section of an improved design showing a rope 703 from the safety mesh at the base of the flight chamber passing through a narrow, vertical slot 702 in the wall 701 of the flight chamber. The flight chamber wall 701 therefore has a series of narrow vertical slots at the level of the safety mesh, through which all of the supporting ropes pass. Each rope is secured to the outer wall 706 using a long-stroke helical spring; when un-extended, this spring forms a compact plate, but extends substantially when the safety mesh is impacted, ensuring that any impact on the safety mesh, even very close to the flight chamber, will be largely absorbed by the long-stroke springs extending. The portion of a cable or rope 703 that passes through a vertical slot or aperture is attached to a barrier 704 that blocks at least in part the slot or aperture to reduces the risk of a person accidentally catching a finger in the slot or aperture.

Operation of Skydiving Simulator

Next, the operation of the skydiving simulator 1 will be described in connection with the movement of the air AR exiting the blower 30.

First of all, the skydiving simulator 1 is configured to recirculate the air AR from the blowers 30a, 30b in the second vertical ducts 13a, 13b, respectively, along the recirculating pathway 11 formed in the recirculating wind tunnel 10, as shown in FIG. 1.

When an engine (or an electric motor) of the blowers 30a, 30b is started, fans 30a1, 30b1 of the respective blowers 30a, 30b are rotated about their respective rotational axis, and this rotation of the fans cause suction of the air AR from the air intakes 32a, 32b of the blowers 30a, 30b at one side, respectively, and expelling the sucked air AR from the discharge ports 31a, 31b at the other side, at a higher pressure than the suction.

After exiting the blowers 30a, 30b, the respective air AR flows downward in the second vertical ducts 13a, 13b. The air AR is redirected to flow toward the first vertical duct 12 side in the second horizontal duct 14b (in the embodiment, the direction is changed by about 90°) by the turning vanes 41, 43 positioned transversely across the flow of the air AR at lower parts of the second vertical ducts 13a, 13b (see flow paths A1, A2 in FIG. 1).

Next, the air AR respectively flowing from the second vertical ducts 13a and 13b into the second horizontal duct 14b toward the first vertical duct 12 are merged and redirected to flow upward in the first vertical duct 12 by the turning vanes 46, 47.

The air AR flowing upward in the first vertical duct 12 is straightened as it passes through the flow straightener 481; the velocity of the air is slowed down by the flow straightener 481.

The air AR is straightened by the flow straightener 481 before it is sent into the narrowing section 49. The velocity of the air AR sent to the narrowing section 49 is increased as the air AR passes through the narrowing section 49, resulting in a powerful, high speed airflow up through the flying chamber 20.

The flyer M in the flying chamber 20 is able to float on the airflow flowing from the lower part to the upper part in the flying chamber 20.

Because the flying chamber 20 has the widening section 203 at the upper section 202, the velocity of the air AR is slowed down as the air AR flows upward to the upper part of the flying chamber 20.

Thus, even if the flyer M rises to the upper section 202 of the flying chamber 20, the velocity of the air AR decreases to such an extent that the flyer M cannot bump against the turning vanes 44, 45; therefore, the flyer M is protected from bumping against the turning vanes 44, 45.

The air AR further flowing upward within the flying chamber 20 through the widening section 203 is branched into two directions: one toward the second vertical duct 13a side in the first horizontal duct 14a and the other toward the second vertical duct 13b side in the first horizontal duct 14a, by the turning vanes 44, 45 disposed at the upper section of the first vertical duct 12 transversely to the flow cross section of the air AR.

The air AR flowing toward the second vertical duct 13a side in the first horizontal duct 14a is redirected by the turning vane 40 to flow downward in the second vertical duct 13a, and then is sucked in at the air intake 32a of the blower 30a disposed in the second vertical duct 13a.

The air AR flowing toward the second vertical duct 13b side in the first horizontal duct 14a is redirected by the turning vane 42 to flow downward in the second vertical duct 13b, and then is sucked in at the air intake 32b of the blower 30b disposed in the second vertical duct 13b.

As described above, the respective air AR from the blowers 30a, 30b are to recirculate along the recirculating pathway 11 in the recirculating wind tunnel 10.

It is intended that the present invention is not limited to the above mentioned embodiment but includes various modifications and improvements that can be made within the range of technical principle thereof.

Summary of Core Concepts

We categorise the key concepts into the following 21 separate concepts, labeled A-U. Note that each concept can be combined with any one or more of the other concepts.

A. A vertical wind tunnel skydiving simulator including a flight chamber entrance that has a curved air deflector that extends into a waiting chamber, in which a convex surface of the curved air deflector faces across or towards the flight chamber entrance or into the flight chamber, and extends into the waiting chamber a sufficient distance to substantially reduce the flow of turbulent air into the waiting chamber.

The curved surface is at the top of the entrance and then the convex side of the surface faces downwards and across the flight chamber entrance, or into the flight chamber.

The curved surface is curved in two or more dimensions

The curvature of the curved surface is defined by a spline

The curved surface is at the sides of the entrance and then the convex side of the surface faces inwards or across the mouth of the entrance, or into the flight chamber. The curved surface is curved in one dimension, as a cylinder is curved in one dimension The curved surface extends into the waiting chamber by an amount that substantially exceeds the width or thickness of the entrance side wall and any protective padding around that entrance, The curved surface extends into the waiting chamber by an amount that substantially exceeds the width or thickness of the entrance side wall and any protective padding around that entrance, with the extent or width of the curved surface being at least as large as the turbulent flow that hits this surface—i.e. so that all turbulent flow passing up across the face of the entrance is captured by the curved surface(s).

The degree of curvature of the convex surface(s) is chosen so that the turbulent flow that hits the convex surface does not separate significantly from the convex surface.

The extent and exact shape of the curved surface is designed to preserve the laminar, non-turbulent flow of air in the flying chamber, even across the flight chamber entrance.

The curved surface is made of flexible and impact absorbing material.

The curved surface includes several layers of rubber, and also FRP and metal.

The curved surface removes the need for an air deflector under the entrance

B. A vertical wind tunnel skydiving simulator including turning vanes positioned in the air ducts and that are extra-large, with for example with a chord length greater than 350 mm and ideally 500 mm, for greater efficiency in altering the airflow direction.

The turning vanes are made of extruded aluminium.

There is an approximately 15 cm separation between adjacent vanes so that only small turbulence/eddies can pass between them. Different dimensions are also possible to achieve this outcome.

C. A vertical wind tunnel skydiving simulator including airflow straighteners positioned under the flight chamber and that are made of metal, such as stainless steel, with thin-walled cells of thickness less than 0.5 mm—for example, 0.05 mm thin walls may be used thin-walled cells of thickness of 0.3 mm-0.05 mm The cells are formed in a honeycomb arrangement.

The cell width could be approximately 129 mm, with 75 mm being the length of each hexagonal side; the depth of each cell is approximately 500 mm. However, other sizes are possible; for example the cells could be far smaller.

D. A vertical wind tunnel skydiving simulator including a duct that is formed from fibre-reinforced plastic (FRP), such as fiberglass, and is shaped to enable a smooth transition from one shape, such as a circular x-section to a rectangular x-section, or a rectangular x-section to a circular x-section.

The shaped duct is a chamber above the flight chamber, and is shaped to enable a smooth transition from the circular x-section of the flight chamber to a rectangular x-section.

The shaped duct is a chamber above the or each axial fan, shaped to enable a smooth transition from the rectangular x-section of the duct above the fan to the circular x-section of the fan chamber.

The FRP is a two layer FRP structure, with a honeycomb of FRP joining the two outer layers of smooth FRP.

The FRP is approximately 90 mm thick; different dimensions are also possible.

E. A vertical wind tunnel skydiving simulator including a waiting area is separated from the main part of the building by a decompression chamber and there is an airtight door between the decompression chamber and the waiting area and another airtight door between the decompression chamber and the main part of the building;

and adjacent to each door (or built into it) is a pneumatic valve and when both sealed doors of the decompression chamber are closed, the valve corresponding to the door which is going to be opened next is opened to smoothly equalize the pressure, to avoid damage to hearing.

F. A vertical wind tunnel skydiving simulator including two or more axial fans in the left side vertical column and two or more axial fans in the right side vertical column; and in which each axial fan sits inside its own duct.

The axial fans are pre-fabricated off site into a complete duct; at the construction site, a pair of separate ducts are assembled in position and next to one another.

G. A vertical wind tunnel skydiving simulator including pressure sensors that are positioned outside of the flight chamber and inside the flight chamber; the sensors continuously monitor air pressure and can shut down the entire system rapidly if air pressure in the flight chamber rises above a defined level.

H. A vertical wind tunnel skydiving simulator including $CO_2$ sensors in the flight chamber that automatically cause air exchangers to be opened if $CO_2$ levels rise too high.

I. A vertical wind tunnel skydiving simulator including a glass floor that is built around a double-height flight chamber, at about half-way up.

J. A vertical wind tunnel skydiving simulator including turning vanes that have internal coolant channels.

Turning vanes are extra-large, with for example a chord length greater than 350 mm and ideally 500 mm, for greater efficiency in altering the airflow direction.

The turning vanes are made of extruded aluminium.

The coolant channels in the vanes are designed to withstand high pressure (e.g. high pressure Freon at 10 ATM)

There are leakage detectors adjacent to the cooling vanes to detect leakage of coolant and automatically shut down the affected section of cooling vanes.

K. A vertical wind tunnel skydiving simulator including a large air exchanger in the top, horizontal ducts that includes an air exhaust system formed by a large, horizontally hinged panel in the upper surface of the top, horizontal ducts.

The air exchanger in the top ducts also includes air inlet system formed by vertically hinged panels in the side (ie vertical) surfaces of the top ducts.

L. A vertical wind tunnel skydiving simulator including axial fans with a diameter exceeding 3.2 m.

The axial fan diameter is approximately 3.5 m.

The axial fan rotates at 600-850 rpm at max load

M. A vertical wind tunnel skydiving simulator including noise sensors inside and outside of the facility that continuously monitor noise levels for compliance with regulations, and the noise sensors provide data to a system that can act to reduce noise when needed.

The system can reduce power automatically if air outlets need to be open

The system can close air outlets automatically if power needs to be maintained

N. A vertical wind tunnel skydiving simulator including UV lights that are used to illuminate the flight chamber and UV reflective clothing or equipment used by the flyers to reflect UV light when all of the ordinary lights are turned low/off for special lighting effects.

O. A vertical wind tunnel skydiving simulator including multiple cameras filming the flight chamber to enable 3D reconstruction of the shape and movement of each flyer.

P. A vertical wind tunnel skydiving simulator including one or more depth sensors that can detect and model objects in the flight chamber to enable 3D reconstruction of the shape and movement of each flyer.

Q. A helmet worn by flyers in a vertical wind tunnel skydiving simulator, the helmet including an augmented reality display.
- Information (e.g. projected onto the normal transparent visor of the helmet) can include time remaining to fly, instructions (e.g. a graphic indicating how to change position—especially useful when a group or team is practicing synchronized manoeuvres etc), of person flying so he can see performance, mistakes or adjustments.
- The flyer can hence clearly see the flight chamber around him or her, but in addition can see the information on the augmented reality display.
- The helmet is linked to RFID tag that is worn by the flyer to uniquely identify that flyer to the system that provides the real-time information to the helmet-based augmented reality display.

R. A helmet worn by flyers in a vertical wind tunnel skydiving simulator, the helmet providing an immersive 3D reality on an integrated high resolution display, such as an Oculus Rift.
- Immersive reality provides any of: real-time video images of the flyer, generated by cameras and depth sensors, real-time video images of an instructor, video images of virtual scenes (e.g. jumping from plane, passing close to other flyers, manouevers with other flyers in a skydiving team, a parachute deploying etc).
- Helmet includes a camera to provide real-time video of the scene in the flight chamber.
- The helmet is linked to RFID tag that is worn by the flyer to uniquely identify that flyer to the system that provides the real-time information to the helmet-based augmented reality display.

S. An RFID tag adapted to be worn by a flyer in a vertical wind tunnel skydiving simulator (e.g. on helmets or suits), in which the RFID tag communicates with a computer-implemented system to enable that system to know who is where in the building (e.g. in decompression chamber, in waiting area, in flight chamber, somewhere else).
- The RFID tag enables the system to know and to control the time spent in the decompression chamber, in the waiting area, in the flight chamber by each flyer.
- The RFID tag enables the system to know and to control when each session starts, when a flyer enters the decompression chamber, and then the waiting area, and then the flight chamber;
- The RFID tag enables the system to automatically set an appropriate airspeed, and/or lighting for the persons flying;
- The RFID tag enables the system to automatically send photos/videos of flyers to the correct destination (email, social media account etc);
- The RFID tag enables the system to know and to control the power consumption for different clients and types of client (e.g. novice, mid-level, experienced sportsman etc.
- The RFID tag enables the system to control the amount to be charged to each customer or type of customer
- Flyers each wear vibration alert devices (e.g. wrist-mounted vibration devices, or an app running on a smartwatch with a vibration function) to allow flyers to be informed with a vibration alert when they need to move to the decompression area, prepare to enter flight chamber, exit flight chamber etc.

T. A vertical wind tunnel skydiving simulator including a matrix of RGB LEDs is used in the expansion chamber above the flight chamber for special lighting effects.
- The RGB LEDs are used to give orientation for sportsmen inside the flying chamber
- north/east/south/west sides may be coloured differently, so that flyers are always aware about their position during performance of complex tricks);
- The RGB LEDs are used for setting the tempo of performance (useful in multiple flyers training)
- The RGB LEDs are used for training games, like 'touch the red spot'.

U. A vertical wind tunnel skydiving simulator including a safety mesh or net at the base of the flight chamber, the safety mesh or net including cables or ropes that are attached to a perimeter wall or surface and that pass through vertical slots or apertures in the walls of the flight chamber so that the safety mesh or net can deflect when receiving an impact close to the walls of the flight chamber.
- The portion of a cable or rope that passes through a vertical slot or aperture is attached to a barrier that blocks at least in part the slot or aperture to reduces the risk of a person accidentally catching a finger in the slot or aperture.
- The or each cable or rope is attached to the perimeter wall or surface using a spring or spring support.
- The spring is a large stroke helical spring that when compressed forms a compact plate.
- The mesh hence provides a soft, deformable surface across substantially the entire width of the flight chamber section and is therefore much safer than conventional designs, where a skydiver hitting the edge of conventional mesh hard can sustain injuries.
- Additional features are:
- Lights are used to illuminate the turning vanes.
- The seam or join between glass panels surrounding the flight chamber include embedded lighting (e.g. LED strips).
- Dynamic pricing for flying session: Pricing will be based on various parameters, such as loading, time of day, whether marketing is planned prior to the sessions, and other events affecting popularity.
- IP telephony integration enables someone handling an incoming call from a customer to have that customer automatically identified using caller ID and for that customer's records to be automatically and immediately displayed to the call handler, giving the background, history and any specific needs of that customer.

REFERENCE SIGNS

1 Skydiving simulator
10 Recirculating chamber
11 Recirculating pathway
12 First vertical duct
13a, 13b Second vertical ducts
14a First horizontal duct
14b Second horizontal duct
20 Flying chamber
201 Floor face
21 Surrounding wall 211 LED device
22 Upper section
23 Frame
231 Top frame
231a End
231b Curved surface
232 Bottom frame
232a End
232b Curved surface
233 Side frame
233a End
233b Curved surface
30a, 30b Blowers
31a, 31b Discharge ports
32a, 32b Air intakes
40 to 47 Turning vanes
40a to 47a Directing vanes
41a1 Base
41a2 Hole
41a3 Middle portion
41a4 Opposite side
50 Waiting chamber
52 Outer wall
53 Inner wall
54, 55 Doors
56 Ceiling
57 Decompression chamber
AR Air
M Flyer

The invention claimed is:

1. A wind tunnel skydiving simulator system to enable flyers to enjoy simulated skydiving, the system including a wind tunnel flight chamber and a virtual reality headset to be worn by a flyer, the system including one or more depth sensors, wherein the system is configured to detect objects in the flight chamber using the one or more depth sensors and to model the detected objects in the flight chamber to enable 3D reconstruction of the shape and movement of each object, wherein the virtual reality headset is configured to operate in the flight chamber to provide immersive images to the flyer wearing the headset, wherein the immersive images simulate the views that would be seen when skydiving in a real or virtual world.

2. The wind tunnel skydiving simulator system of claim 1, wherein the virtual reality headset provides an immersive 3D reality display output.

3. The wind tunnel skydiving simulator system of claim 2, wherein the immersive 3D reality display output includes real-time video images of an instructor.

4. The wind tunnel skydiving simulator system of claim 2, wherein the immersive 3D reality display output includes video images of scenes, including one or more of the following: jumping from a plane, passing close to other flyers, manouevers with other flyers in a skydiving team, a parachute deploying.

5. The wind tunnel skydiving simulator system of claim 1, wherein the virtual reality headset includes an integrated high resolution display.

6. The wind tunnel skydiving simulator system of claim 1, wherein the virtual reality headset is an Oculus Rift™ type headset.

7. The wind tunnel skydiving simulator system of claim 1, wherein the virtual reality headset is an integral part of a helmet worn by the flyer.

8. The wind tunnel skydiving simulator system of claim 1, including flight chamber walls, wherein the flight chamber walls do not include any projection screen.

9. The wind tunnel skydiving simulator system of claim 1, the system including cameras, wherein the immersive images include real-time video images of the flyer, generated using the cameras and the depth sensors.

10. The wind tunnel skydiving simulator system of claim 1, wherein a helmet worn by the flyer includes a camera to provide to the flyer real-time video of the scene in the flight chamber.

11. The wind tunnel skydiving simulator system of claim 1, wherein the system includes a RFID tag that is worn by the flyer to uniquely identify that flyer to the system, and wherein the system is configured to send real-time information to the virtual reality headset of the flyer, identified using the RFID tag.

12. The wind tunnel skydiving simulator system of claim 11, wherein the information includes time remaining to fly.

13. The wind tunnel skydiving simulator system of claim 11, wherein the information includes instructions to the flyer.

14. The wind tunnel skydiving simulator system of claim 11, wherein the information includes real-time video of the flyer so he can see mistakes or adjustments.

15. The wind tunnel skydiving simulator system of claim 1, wherein the system is configured to detect and to model objects in the flight chamber to enable 3D reconstruction of the shape and movement of each flyer.

16. The wind tunnel skydiving simulator system of claim 1, including multiple video cameras in the flight chamber, arranged to film the flight chamber, to enable 3D reconstruction of the shape and movement of each flyer.

17. The wind tunnel skydiving simulator system of claim 1, including a plurality of glass panels which surround the flight chamber, wherein the seams or joins between the glass panels surrounding the flight chamber include embedded lighting, such as LED strips.

18. The wind tunnel skydiving simulator system of claim 1, the system including ordinary lights to illuminate the flight chamber and including UV lights that are used to illuminate the flight chamber and UV reflective clothing or equipment used by the flyers to reflect UV light when all of the ordinary lights are turned low/off for special lighting effects.

19. The wind tunnel skydiving simulator system of claim 1, including turning vanes positioned in air ducts leading to and from the flight chamber and that are extra-large, with a chord length greater than 350 mm for greater efficiency in altering the airflow direction.

20. The wind tunnel skydiving simulator system of claim 19, in which there is an approximately 15 cm separation between adjacent vanes so that only small turbulence/eddies can pass between them.

21. The wind tunnel skydiving simulator system of claim 1, including a single vertically mounted axial fan in a vertical air duct leading to or from the flight chamber.

22. The wind tunnel skydiving simulator system of claim 1, including a duct that is formed from fibre-reinforced plastic (FRP), and is shaped to enable a smooth transition from one shape, such as a circular x-section to a rectangular x-section, or a rectangular x-section to a circular x-section.

23. The wind tunnel skydiving simulator system of claim 1, including a waiting area that is separated from a main part of a building housing the system by a decompression chamber and including an airtight door between the decompression chamber and the waiting area and including another airtight door between the decompression chamber and the main part of the building;

and including adjacent to each door, or built into each door, or in the same wall as each door, a pneumatic valve and when both sealed doors of the decompression chamber are closed, the valve corresponding to the door which is going to be opened next is configured to open smoothly to equalize the pressure, to avoid damage to hearing.

24. The wind tunnel skydiving simulator system of claim 1, including $CO_2$ sensors in the flight chamber that automatically cause air exchangers to be opened if $CO_2$ levels rise too high.

25. The wind tunnel skydiving simulator system of claim 1, including a glass floor that is built around a double-height flight chamber, at about half-way up the double-height flight chamber.

26. The wind tunnel skydiving simulator system of claim 1, including noise sensors inside and outside of a building that includes the wind tunnel flight chamber, wherein the noise sensors continuously monitor noise levels for compliance with regulations, and the noise sensors provide data to a system that can act to reduce noise when needed.

27. The wind tunnel skydiving simulator system of claim 1, including a safety mesh or net at the base of the flight chamber, the safety mesh or net including cables or ropes that are attached to a perimeter wall or surface and that pass through vertical slots or apertures in the walls of the flight chamber so that the safety mesh or net can deflect when receiving an impact close to the walls of the flight chamber.

28. A method of operating a wind tunnel skydiving simulator system including a flight chamber and one or more depth sensors, which enables flyers to enjoy simulated skydiving, including the steps of:
    (i) providing a virtual reality headset to a flyer using the flight chamber in the wind tunnel skydiving simulator, and
    (ii) detecting objects in the flight chamber using the one or more depth sensors and modelling the detected objects in the flight chamber to enable 3D reconstruction of the shape and movement of each object; and
    (iii) displaying immersive 3D virtual reality images on the virtual reality headset that simulate for the flyer the views that would be seen when skydiving in a real or virtual world.

* * * * *